(12) United States Patent
Gravett et al.

(10) Patent No.: US 9,812,879 B2
(45) Date of Patent: Nov. 7, 2017

(54) BATTERY THERMAL MONITORING SYSTEM

(71) Applicants: John Russell Gravett, Wildomar, CA (US); Brian Joseph Green, Murrieta, CA (US)

(72) Inventors: John Russell Gravett, Wildomar, CA (US); Brian Joseph Green, Murrieta, CA (US)

(*) Notice: Subject to any disclaimer, the term of this patent is extended or adjusted under 35 U.S.C. 154(b) by 10 days.

(21) Appl. No.: 14/805,210

(22) Filed: Jul. 21, 2015

(65) Prior Publication Data

US 2017/0025868 A1  Jan. 26, 2017

(51) Int. Cl.
*H02J 7/04* (2006.01)
*H02J 7/00* (2006.01)
*G01K 7/22* (2006.01)
*H01M 10/48* (2006.01)
*H01M 10/06* (2006.01)
*H01M 10/42* (2006.01)
*H01M 10/44* (2006.01)

(52) U.S. Cl.
CPC .............. *H02J 7/0031* (2013.01); *G01K 7/22* (2013.01); *H01M 10/06* (2013.01); *H01M 10/425* (2013.01); *H01M 10/443* (2013.01); *H01M 10/486* (2013.01); *H02J 7/0091* (2013.01)

(58) Field of Classification Search
CPC ........ H02J 7/007; H02J 7/0021; H02J 7/0031; H01M 10/486
USPC .................. 320/134, 150; 324/426
See application file for complete search history.

(56) References Cited

U.S. PATENT DOCUMENTS

| 2006/0259280 | A1* | 11/2006 | Zaccaria ............ G01R 31/3648 702/188 |
| 2008/0278111 | A1* | 11/2008 | Genies .................. H02J 7/0073 320/101 |
| 2011/0199053 | A1* | 8/2011 | Minamiura ......... H01M 10/441 320/136 |

* cited by examiner

*Primary Examiner* — Edward Tso
*Assistant Examiner* — Aaron Piggush
(74) *Attorney, Agent, or Firm* — Plager Schack LLP

(57) ABSTRACT

A battery thermal monitoring system prevents thermal runaway during battery charging. A temperature sensor and relay may be connected to each battery. The temperature at each battery may be compared to the ambient temperature in the charging system. When the temperature difference between the battery charging temperature and the ambient temperature exceeds a predetermined difference, the relay may disconnect the battery from the charging source.

8 Claims, 4 Drawing Sheets

BATTERY THERMAL MONITORING SYSTEM

BACKGROUND

The embodiments herein relate generally to electrical systems and more particularly, to a battery thermal monitoring system.

Conventional battery monitoring is performed for a group of batteries. Sometimes during battery charging heat can build up in a condition known as thermal runaway. In valve-regulated lead-acid (VRLA) batteries, thermal runaway can cause battery breakdown and fire. Unfortunately, conventional techniques typically measure only battery temperature. Some approaches indirectly measure battery temperature via voltage or current readings. However, such approaches may not provide an accurate gauge of charging safety, particularly in hot environments.

SUMMARY

In one aspect, a system for monitoring thermal conditions during battery charging comprises a first sensor configured to detect ambient temperature; a relay connected to a battery and to a charging source; a second sensor connected to the battery, the second sensor configured to detect battery charging temperature at the battery; and a processor connected to the first sensor, the second sensor, and to the relay, the processor configured to: receive a battery charging temperature from the second sensor, determine a temperature difference value between the battery charging temperature and the ambient temperature, and in response to the temperature difference value exceeding a predetermined difference value, send a signal to the relay to disconnect the battery from the charging source.

In another aspect, a system for monitoring thermal conditions during battery charging comprises an ambient temperature sensor; a plurality of relays connected to a plurality of batteries and to a charging source; a plurality of battery temperature sensors connected to each one of the respective plurality of batteries; and a processor connected to the ambient temperature sensor, the plurality of battery temperature sensors, and to the plurality of relays, the processor configured to: receive a battery charging temperature from each of the plurality of battery temperature sensors during battery charging, for each of the plurality of batteries, determine a temperature difference value between the battery charging temperature from each of the plurality of battery temperature sensors during battery charging and the ambient temperature, and in response to the temperature difference value exceeding a predetermined difference value for any of the plurality of batteries, trigger an alert indicating thermal runaway.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the present disclosure provide a system and method for monitoring battery temperature during the charging process. Embodiments isolate batteries to prevent thermal runaway and the damage associated therewith. Embodiments compare the ambient temperature to the temperature at a battery. In response to the condition that the difference between the battery temperature during charge and the ambient temperature exceeds a predetermined value, an alert may be issued and in some embodiments, the battery is automatically disconnected from charging.

Figure 1:
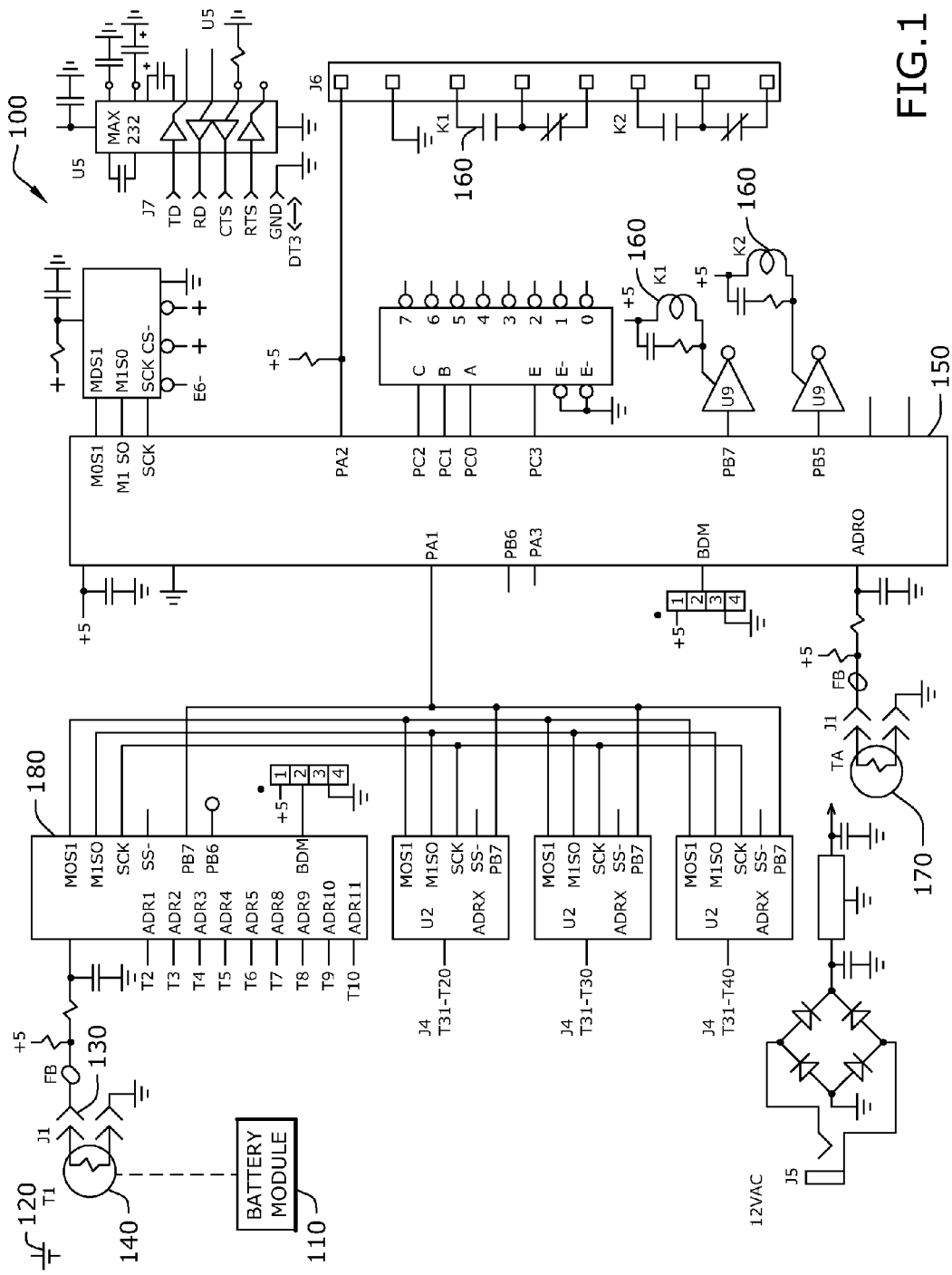
FIG. 1 is an electrical schematic of a battery thermal monitoring system according to an embodiment of the subject disclosure.

Referring now to FIG. 1, an electric schematic of a battery thermal monitoring system is shown according to an exemplary embodiment of the subject technology. The battery thermal monitoring system 100 (referred to generally herein as the "system 100") may be useful for valve-regulated lead-acid (VRLA) batteries which can catch fire during thermal runaway events. The system 100 monitors the temperature in a string of up to forty VRLA batteries in a battery module 110 and provides early warning of temperature issues. The system 100 also disconnects the battery string from a charging source 120 prior to the batteries entering a thermal runaway condition. Each battery is connected to a battery temperature sensor 140. For sake of illustration only a single battery temperature sensor 140 is called out however, each element labeled "T" followed by a number represents a battery temperature sensor 140. In addition, a microcontroller 180 may include 10 battery temperature sensor inputs and the system may include 4 microcontrollers 180 for monitoring up to 40 batteries. In an exemplary embodiment, the battery temperature sensor 140 may be a thermistor. Some embodiments may be configured for wireless feedback from the thermistors to the microcontroller 180. A terminal connection 130 (labeled "J") may connect each battery temperature sensor 140 and to the corresponding address input on the microcontroller 180. The system 100 also includes an ambient sensor 170 detecting the ambient temperature of the system environment. Feedback signals from the battery temperature sensors 140 and the ambient temperature sensor 170 are provided to a processor 150.

Figure 2:
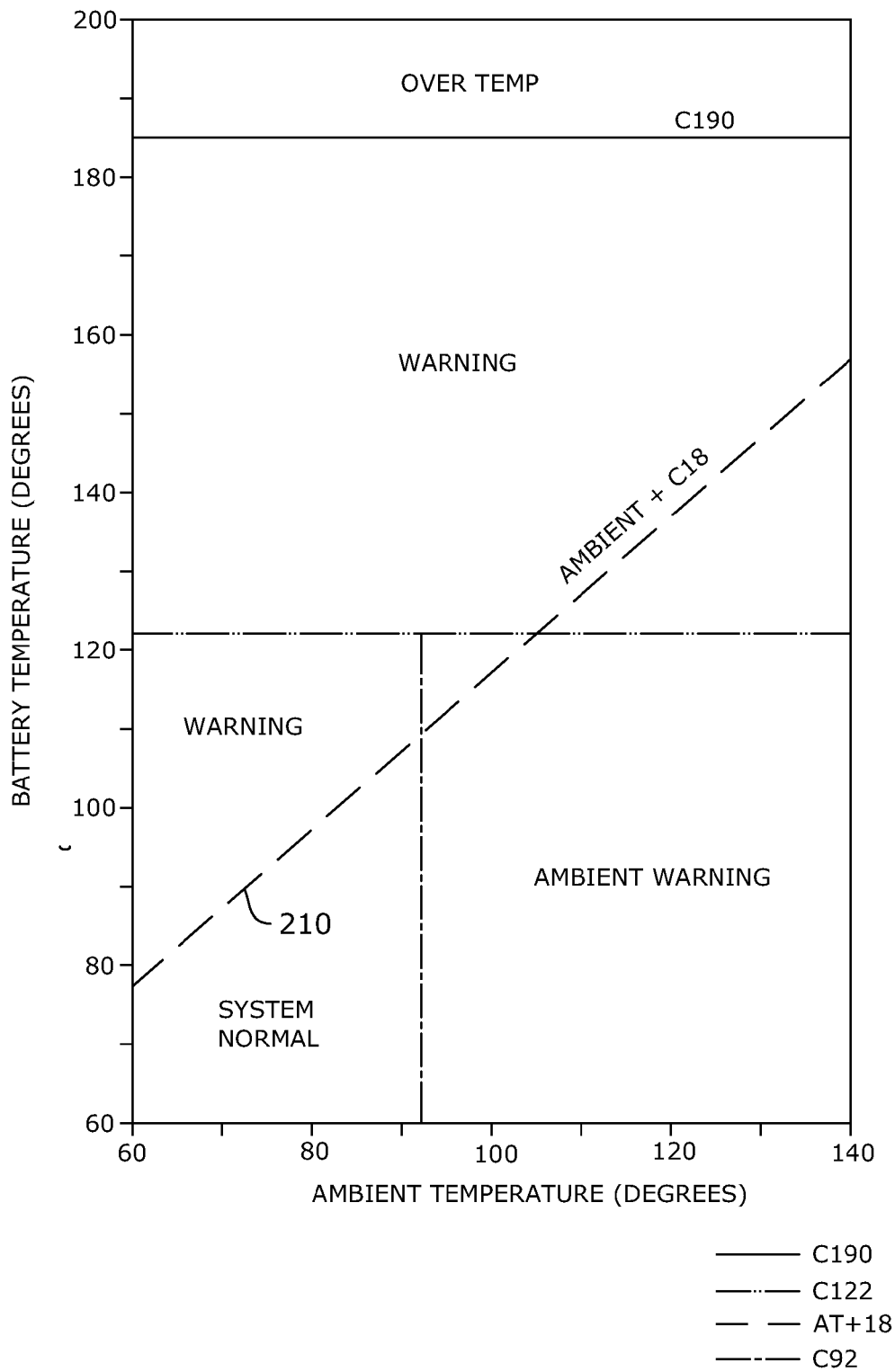
FIG. 2 is a chart displaying conditions of thermal runaway and warning according to an embodiment of the subject disclosure.

The processor 150 may include memory (for example, firmware) that stores a predetermined temperature difference value. The firmware may also include instructions for comparing the measured temperature at each battery temperature sensor 140 to the measured ambient temperature at the ambient temperature sensor 170. The processor 150 may be configured to cyclically check whether the temperature difference at each battery temperature sensor 140 exceeds the predetermined temperature difference value. Referring concurrently now to FIG. 2, in an exemplary embodiment, the predetermined temperature difference value may be 18° F. Below the diagonal line 210 and at less than 92° F. ambient, the system 100 is charging under normal operation. The area above the diagonal line 210 indicates the predetermined temperature difference value is exceeded and a warning is triggered. For example, if any battery is 18° F.

over ambient, a warning alarm occurs and a warning relay 160 is activated. If the ambient temperature reaches 92° F., a warning alarm occurs and a warning relay 160 is activated. If any battery reaches 122 degrees ° F., a warning alarm occurs and a warning relay 160 is activated. If any battery reaches 190° F., a warning alarm occurs, a warning relay 160 is activated, and a second relay 160 used to open the battery breaker is activated.

Figure 3:
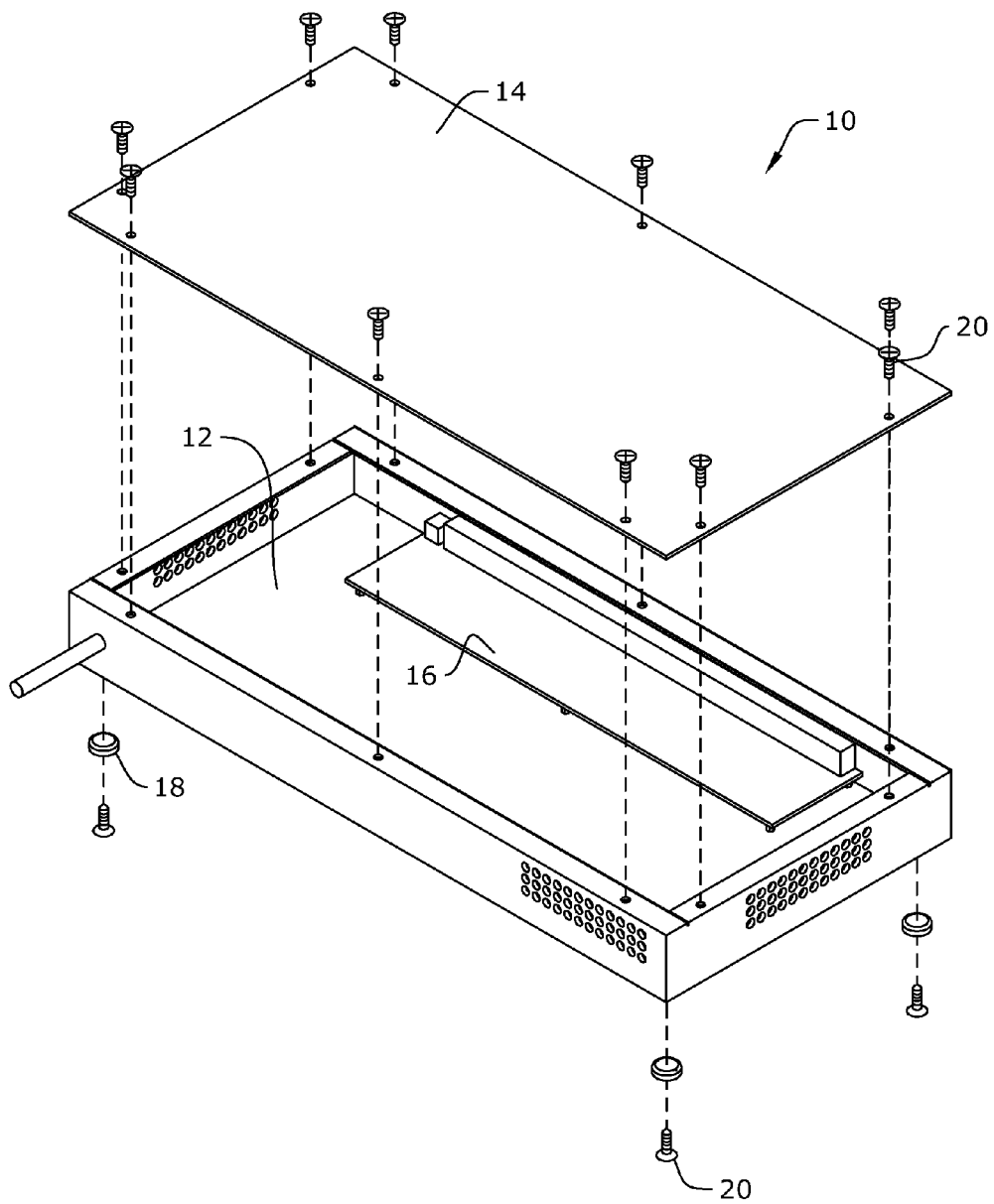
FIG. 3 is an exploded bottom view of a battery thermal monitoring system module according to an embodiment of the subject disclosure.

Referring now to FIG. 3, a battery thermal monitoring system housing 10 is shown. The housing 10 may contain the elements described in FIG. 1. A PCB 16 (on which may be mounted the sensors and electrical components of FIG. 1) may be mounted to a rear wall 12. The interior of the housing 10 may be protected by a cover 14. Screws 20 may fasten the cover 14 and feet 18 to the housing 10.

Figure 4:
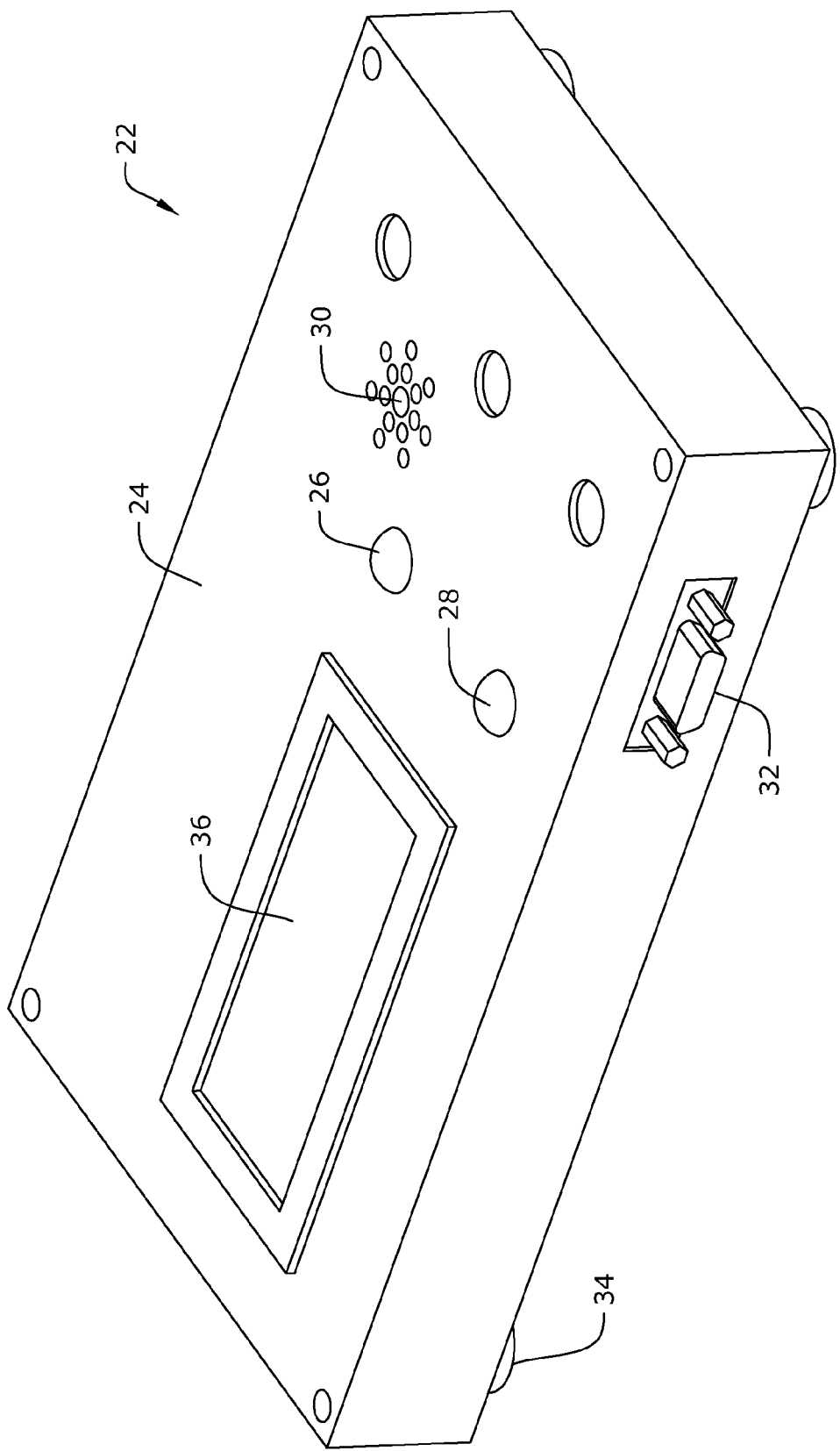
FIG. 4 is a perspective top view of a battery thermal monitoring system module according to an embodiment of the subject disclosure.

Referring now to FIG. 4, a battery thermal monitoring system module 22 is shown. The module 22 may contain the elements described in FIG. 1 in a shell 24. The shell 24 may include indicator lights 26 and 28, Indicator light 26 may be lit during normal charging operation. Indicator light 28 may be lit as a warning triggered in response to the predetermined temperature difference (or one of the other temperature conditions) is exceeded. Some embodiments may include a speaker 30 for producing an audible warning if one of the warning conditions is triggered. The module 22 may include a display 36 for showing temperature readings and delta T readings for each battery being monitored. A data port 32 may be included for programming all the conditions for normal operation and for triggering a warning into the processor 150 (FIG. 1) via a laptop and RS232 communications. The shell 24 may include feet 34 to offset the module 22 from a surface.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for monitoring thermal conditions during battery charging, comprising:
    a first sensor configured to detect ambient temperature;
    a second sensor connected to a battery, the second sensor configured to detect battery charging temperature at the battery;
    a first relay connected to the battery and a charging source
    a second relay connected to a processor and an alarm configured to provide notification of an alarm condition; and
    the processor connected to the first sensor, the second sensor, the first relay, and to the second relay, the processor configured to:
    receive a battery charging temperature from the second sensor,
    determine a temperature difference value between the battery charging temperature and the ambient temperature, and
    in response to the temperature difference value exceeding a predetermined difference value, send a signal to the first relay to disconnect the battery from the charging source and activate the second relay to issue a warning alarm, prior to a thermal runaway condition associated with the temperature difference value between the battery charging temperature and the ambient temperature being met.

2. The system for monitoring thermal conditions during battery charging of claim 1, wherein the battery is a valve-regulated lead-acid battery.

3. The system for monitoring thermal conditions during battery charging of claim 1, wherein the second sensor is a thermistor.

4. The system for monitoring thermal conditions during battery charging of claim 3, wherein the thermistor is wirelessly connected to the processor.

5. A system for monitoring thermal conditions during battery charging, comprising:
    an ambient temperature sensor;
    a plurality of relays connected to a plurality of batteries and to a charging source;
    a plurality of battery temperature sensors connected to each one of the respective plurality of batteries; and
    a processor connected to the ambient temperature sensor, the plurality of battery temperature sensors, and to the plurality of relays, the processor configured to:
    receive a battery charging temperature from each of the plurality of battery temperature sensors during battery charging,
    for each of the plurality of batteries, determine a temperature difference value between the battery charging temperature from each of the plurality of battery temperature sensors during battery charging and the ambient temperature, and
    in response to the temperature difference value exceeding a predetermined difference value for any of the plurality of batteries, trigger an alert indicating thermal runaway and disconnecting a relay connected to an identified one of the plurality of batteries from the charging source, the identified one of the plurality of batteries determined as being measured with a temperature difference value exceeding the predetermined difference value prior to a thermal runaway condition being met.

6. The system for monitoring thermal conditions during battery charging of claim 5, wherein the plurality of batteries are valve-regulated lead-acid batteries.

7. The system for monitoring thermal conditions during battery charging of claim 5, wherein the plurality of battery temperature sensors are thermistors.

8. The system for monitoring thermal conditions during battery charging of claim 7, wherein the thermistors are wirelessly connected to the processor.

* * * * *